United States Patent
Miyata et al.

(10) Patent No.: US 7,326,146 B2
(45) Date of Patent: Feb. 5, 2008

(54) TOROIDAL-TYPE CONTINUOUSLY VARIABLE TRANSMISSION AND CONTINUOUSLY VARIABLE TRANSMISSION APPARATUS

(75) Inventors: Shinji Miyata, Kanagawa (JP); Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 19 days.

(21) Appl. No.: 10/421,803

(22) Filed: Apr. 24, 2003

(65) Prior Publication Data
US 2003/0224895 A1    Dec. 4, 2003

(30) Foreign Application Priority Data
Apr. 25, 2002    (JP)    ............. P. 2002-124359

(51) Int. Cl.
*F16H 15/38*    (2006.01)
(52) U.S. Cl. .................... 476/40; 476/42
(58) Field of Classification Search .......... 476/40, 476/42, 46; 475/207, 215, 216
See application file for complete search history.

(56) References Cited

U.S. PATENT DOCUMENTS

| | | | |
|---|---|---|---|
| 5,033,322 A | 7/1991 | Nakano | |
| 5,569,112 A | 10/1996 | Fukushima | |
| 5,607,372 A | 3/1997 | Lohr | |
| 5,651,750 A | 7/1997 | Imanishi et al. | |
| 6,158,897 A * | 12/2000 | Sivonen et al. | 384/518 |
| 6,171,210 B1 * | 1/2001 | Miyata et al. | 475/216 |
| 6,561,941 B2 * | 5/2003 | Nakano et al. | 475/214 |
| 6,659,907 B2 * | 12/2003 | Hirano et al. | 476/42 |

| | | | |
|---|---|---|---|
| 2002/0019285 A1 | 2/2002 | Henzler | |
| 2002/0169051 A1 * | 11/2002 | Oshidari | 476/10 |

FOREIGN PATENT DOCUMENTS

| | | |
|---|---|---|
| JP | 2-283949 | 11/1990 |
| JP | 6-307514 | * 11/1994 |
| JP | 7-96901 | 10/1995 |
| JP | 8-4869 | 1/1996 |
| JP | 8-61453 | 3/1996 |
| JP | 11-280863 | * 10/1999 |
| JP | 2001-116097 | 4/2001 |
| JP | 2002-139124 | 5/2002 |
| JP | 2002-250423 | * 9/2002 |

OTHER PUBLICATIONS

Mechanical Engineering Design, forth edition, Joseph Edward Shigley, 1993, pp. 507-508.*

* cited by examiner

*Primary Examiner*—William C. Joyce
(74) *Attorney, Agent, or Firm*—Sughrue Mion, PLLC

(57) ABSTRACT

A toroidal-type continuously variable transmission has a casing; a rotary shaft; a pair of outside disks each including an axial-direction one-side surface and supported on the rotary shaft so as to be rotated in synchronization with the rotary shaft; an inside disk including axial-direction two-side surfaces and rotatably supported on the periphery of the middle portion of the rotary shaft so as to be rotated with respect to the rotary shaft; support members disposed between the one side axial-direction surface and the axial-direction one-side surface so as to be swung and shifted about pivot shafts thereof; power rollers rotatably supported on the support members, the peripheral surface of the power rollers being contacted with the axial-direction two-side surface and the axial-direction one-side surface; and ball bearings for supporting the inside disk in such a manner that the inside disk is rotated with respect to the casing.

9 Claims, 6 Drawing Sheets

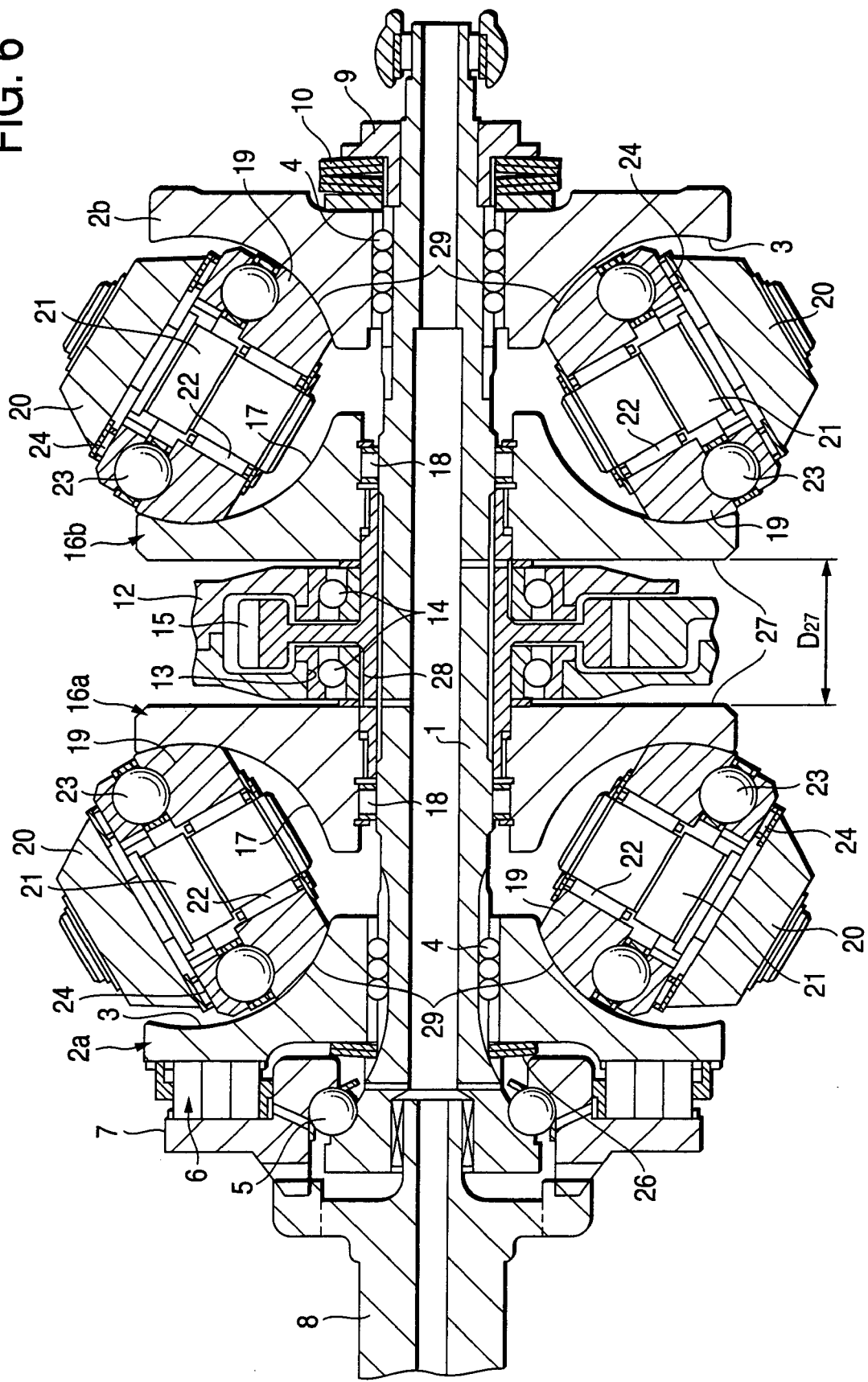

)
TOROIDAL-TYPE CONTINUOUSLY VARIABLE TRANSMISSION AND CONTINUOUSLY VARIABLE TRANSMISSION APPARATUS

BACKGROUND OF THE INVENTION

1. Field of the Invention

A toroidal-type continuously variable transmission and a continuously variable apparatus according to the present invention are used as a transmission apparatus for a vehicle or a transmission apparatus for controlling the operating speed of various industrial machines such as a pump.

2. Description of the Related Art

As a transmission constituting a transmission apparatus for a vehicle, a toroidal-type continuously variable transmission is known and is enforced in part of the vehicle industry. The toroidal-type continuously variable transmission enforced in part of the vehicle industry is a toroidal-type continuously variable transmission of a so called double cavity type in which transmission of power from an input part to an output part is executed in two systems which are arranged in parallel to each other. Such a toroidal-type continuously variable transmission is disclosed in many publications such as U.S. Pat. No. 5,033,322, U.S. Pat. No. 5,569,112 and U.S. Pat. No. 5,651,750 and is thus conventionally known. Description will be given below of the basic structure of this transmission with reference to FIG. 6.

The toroidal-type continuously variable transmission shown in FIG. 6 includes an input rotary shaft 1 serving as a rotary shaft. And, on the near-to-base-end (in FIG. 6, the left-side)portion and the near-to-leading end (in FIG. 6, the right-side) portion of the middle portion of the input rotary shaft 1, there supported input side disks 2a, 2b, respectively. The two input side disks 2a, 2b are supported on the input rotary shaft 1 through their respective ball splines 4, 4 in such a manner that their respective input side surfaces 3, 3, which are axial-direction one-side surfaces of the two input side disks 2a, 2b and are formed as toroid curved surfaces, are opposed to each other. Therefore, the two input side disks 2a, 2b are supported on the periphery of the input rotary shaft 1 in such a manner that they can be shifted in the axial direction of the input rotary shaft 1 and can be rotated in synchronization with the input rotary shaft 1.

Also, between the base end portion (in FIG. 6, the left end portion) of the input rotary shaft 1 and the outer surface of the input side disk 2a, there are interposed a rolling-bearing 5 and a pressing device 6 of a loading cam type. And, a cam plate 7, which constitutes the pressing device 6, can be driven and rotated by a drive shaft 8. On the other hand, between the leading end portion (in FIG. 6, the right end portion) of the input rotary shaft 1 and the outer surface of the other input side disk 2b, there are interposed a loading nut 9 and a countersunk plate spring 10 having large elasticity.

The middle portion of the input rotary shaft is penetrated through a through hole 13 formed in a partition wall portion 12 disposed in the interior of a casing 11(see FIG. 1 which shows an embodiment of the present invention) in which the toroidal-type continuously variable transmission. On the inside diameter side of the through hole 13, there is rotatably supported a cylindrical-shaped output cylinder 28 by a pair of rolling bearings 14, 14. On an outer peripheral surface of the intermediate portion of the cylindrical-shaped output cylinder 28, there is fixed an output gear 15. Also, on the portions of the two end portions of the output cylinder 28 that project from the two outer surfaces of the partition wall 12, there are supported output side disks 16a, 16b serving as inside disks in such a manner that they can be rotated in synchronization with the output cylinder 28 by spline engagement.

In this state, the output side surfaces 17, 17 of the output side disks 16a, 16b, which are the one-side surfaces of the output side disks 16a, 16b and are formed as toroid surfaces, are opposed to the input side surfaces 3, 3. Also, between the portions of the inner peripheral surfaces of the output side disks 16a, 16b that project from the end edge of the output cylinder 28 and the outer peripheral surface of the middle portion of the input rotary shaft 1, there are interposed needle roller bearings 18, 18. And, while loads applied to the output side disks 16a, 16b are being supported, the output side disks 16a, 16b can be rotated with respect to the input rotary shaft 1 and can be shifted in the axial direction of the input rotary shaft 1.

In the portions (cavities) of the periphery of the input rotary shaft 1 that are present between the input and output side surfaces 3, 17, there are disposed power rollers 19, 19 by two or more (generally, by twos or by trees). The power rollers 19, 19 are respectively supported by displacement shafts 21, 21, radial needle roller bearings 22, 22, thrust ball bearings 23, 23 and thrust needle roller bearings 24, 24 on the side surface portions of trunnions 20, 20 serving as support members, the peripheral surfaces 29, 29 of which are formed as spherical-shaped convex surfaces and are contacted with the input and output side surfaces 3, 17, in such a manner that they can be rotated as well as can be swung and shifted slightly. That is, the displacement shafts 21, 21 are respectively eccentric shafts arranged such that their respective base and front half sections are eccentric to each other; and, the base half sections are swingably and shiftably supported on the middle portions of the trunnions 20, 20 by another radial needle roller bearings (not shown).

The power rollers 19, 19 are rotatably supported on the front half sections of the above-structured displacement shafts 21, 21 by the radial needle roller bearings 22, 22 and thrust ball bearings 23, 23. Also, when the respective composing parts of the toroidal-type continuously variable transmission are elastically formed, the another radial needle roller bearings and thrust needle roller bearings 24, 24 allow the power rollers 19, 19 to shift in the axial direction of the input rotary shaft 1.

Further, in the case of the trunnions 20, 20, pivot shafts disposed on the two end portions (in FIG. 6, in the front and back direction) thereof are supported on support plates 25a, 25b (see FIGS. 1, 2 and 5 respectively showing the embodiments of the present invention) installed in the interior of the casing 11 in such a manner that they can be swung and can be shifted in the axial direction thereof. That is, the trunnions 20, 20 not only are supported such that they can be shifted in clockwise and counter-clockwise directions in FIG. 6 but also can be shifted by an actuator (not shown) in such a manner that they can be shifted in the axial direction of the pivot shafts (in FIG. 1, in the left-half-section direction, in FIG. 6, in the front and back direction; and, in FIGS. 1 and 2, in the right-half-section direction and, in FIG. 5, in the vertical direction)

When putting the above-structured toroidal-type continuously variable transmission into operation, the input side disk 2a is driven and rotated by the drive shaft 8 through the pressing device 6. Since this pressing device 6 drives and rotates the input side disk 2a while generating a thrust force in the axial direction thereof, while the input side disks 2a, 2b including the above input side disk 2a are being pressed toward the output side disks 16a, 16b, they are rotated in synchronization with each other. As a result of this, the rotational movements of the pair of input side disks 2a, 2b are transmitted through the power rollers 19, 19 to the output disks 16a, 16b, thereby rotating the output gear 15 connected to the output side disks 16a, 16b through the output cylinder 28.

When the toroidal-type continuously variable transmission is in operation, since the pressing device 6 generates the thrust force, there can be secured surface pressures in the respective contact portions between the peripheral surfaces 29, 29 of the power rollers 19, 19 and the input and output side surfaces 3, 17. Also, the surface pressures increase as the power (torque) to be transmitted from the drive shaft 8 to the output gear 15 increases. Thanks to this, there can be obtained a good transmission efficiency regardless of variations in the torque. Also, even in case where the torque to be transmitted is 0 or a very small, due to the countersunk plate spring 10 and a pre-load spring 26 which is disposed on the inside diameter side of the pressing device 6, in the respective contact portions, there can be secured a certain degree of surface pressure. Therefore, the torque transmission in the respective contact portions, just after the start of the operation of toroidal-type continuously variable transmission, can be carried out smoothly without incurring an excessive degree of slippage.

To change a transmission ratio between the drive shaft 8 and output gear 15, using an actuator (not shown), the trunnions 20, 20 may be shifted in the front and back direction of FIG. 6. In this case, the upper and lower (in FIG. 6) half sections of the trunnions 20, 20 are shifted by the same amount in the mutually opposite directions. These shifting movements of the upper and lower half sections of the trunnions 20, 20 change the direction of the force which is applied to the contact portions between the peripheral surfaces 29, 29 of the power rollers 19, 19 and the input and output side surfaces 3, 17 in the tangential direction thereof. Due to such tangential-direction force, the trunnions 20, 20 are swung about the pivot shafts which are respectively disposed on the two end portions of these trunnions 20, 20.

The swinging movements of the trunnions 20, 20 change the positions of the contact portions the peripheral surfaces 29, 29 of the power rollers 19, 19 and the input and output side surfaces 3, 17 with respect to the diameter direction of these side surfaces 3, 17. As the contact portions are changed outwardly in the diameter direction of the input side surface 3 and inwardly in the diameter direction of the output side surface 17, the transmission ratio is changed to the speed increasing side. On the other hand, as the contact portions are changed inwardly in the diameter direction of the input side surface 3 and outwardly in the diameter direction of the output side surface 17, the transmission ratio is changed to the speed reducing side.

By the way, in the case of the conventional structure shown in FIG. 6, since, between the outer surfaces 27, 27 of the pair of output side disks 16a, 16b, there are interposed, in addition to the output gear 15, the pair of rolling bearings 14, 14 and partition wall portion 12 for supporting these rolling bearings 14, 14, the distance $D_{27}$ between the two outer surfaces 27, 27 increases. This increases the axial-direction dimension of the toroidal-type continuously variable transmission, which in turn increases the size and weight of the toroidal-type continuously variable transmission. The increase in the size and weight of the toroidal-type continuously variable transmission is caused not only by such increase in the distance $D_{27}$ but also by an increase in the axial-direction thickness of the output side disks 16a, 16b. The reason for this is as follows.

In the speed reducing state of the toroidal-type continuously variable transmission shown in FIG. 6, in a state where the peripheral surfaces 29, 29 of the power rollers 19, 19 are in contact with the near-to-outside-diameter portions of the output side surfaces 17, 17 of the output side disks 16a, 16b, they press against these output side surfaces 17, 17. Due to this, to the output side disks 16a, 16b, there is applied large moment with the spline-connected portions of the output disks 16a, 16b to the output cylinder 28 as the center thereof. In order not only to prevent the transmission ratio from being shifted but also to secure the durability of the output side disks 16a, 16b, it is necessary to restrict the elastic deformation of the output side disks 16a, 16b. And, for this purpose, it is necessary to increase the thickness dimensions of the output side disks 16a, 16b in the axial direction thereof to thereby enhance the rigidity of the output side disks 16a, 16b. For these reasons, in case where the axial-direction thickness dimensions of the output side disks 16a, 16b are increased, the size of the toroidal-type continuously variable transmission is accordingly increased in the above-mentioned manner.

On the other hand, in JP-A-2001-116097, there is disclosed a structure in which an integrally-formed output side disk is rotatably supported on the periphery of the middle portion of an input side rotary shaft by a pair of radial needle roller bearings and a pair of thrust needle roller bearings. According to the structure disclosed in the above-cited publication, not only because the partition wall portion 12 can be omitted from the conventional structure shown in FIG. 6 but also because the axial-direction dimensions of the output side disks can be reduced, the size and weight of the whole of a toroidal-type continuously variable transmission can be reduced.

However, in the case of the thrust needle roller bearings employed in the last-cited publication, since heat is generated excessively due to slippage friction in the rolling contact portions between the rolling surfaces of the respective needle rollers thereof and their mating raceway surfaces, it is difficult to use the thrust needle roller bearings in a state where a preload is applied. In other words, in a case where the lives of the thrust needle roller bearings should be secured sufficiently, the thrust needle roller bearings must be used in a state where they have a positive clearance between them. For this reason, it is difficult to restrict the axial-direction position of the output side disk strictly and thus there is a possibility that the contact positions between the output side surface of the output side disk and the peripheral surfaces of the respective power rollers can be shifted slightly.

In case where the contact positions between the output side surface of the output side disk and the peripheral surfaces of the power rollers are shifted for such reason, there arises a possibility that, in the rolling contact portions of these mating surfaces, there can be generated side slippage, the trunnions supporting the power rollers can be rotated about their respective pivot shafts, and thus the transmission ratio of the toroidal-type continuously variable transmission can be varied unexpectedly. Such state is undesirable because it gives a driver a strange feeling. Especially, in the case of a continuously variable transmission apparatus in which a toroidal-type continuously variable transmission unit and a planetary-gear-type transmission unit are combined together to thereby realize an infinite transmission ratio, in a state where a large torque passes through the toroidal-type continuously variable transmission unit, the transmission ratio must be controlled delicately.

Therefore, it is especially undesirable that the transmission ratio is changed unexpectedly.

SUMMARY OF THE INVENTION

The toroidal-type continuously variable transmission and continuously variable transmission apparatus of the present invention are invented in view of the circumstances of the above-mentioned related art.

In attaining the above object, according to the present invention, there is provided a toroidal-type continuously variable transmission having; a casing; a rotary shaft rotatably supported in an interior of the casing; a pair of outside disks each including an axial-direction one-side surface having an arc-shaped section and supported on the rotary shaft so as to be rotated in synchronization with the rotary shaft, the respective axial-direction one-side surfaces being opposed to each other; an inside disk including axial-direction two-side surfaces each having an arc-shaped section and rotatably supported on the periphery of the middle portion of the rotary shaft so as to be rotated with respect to the rotary shaft, the axial-direction two-side surfaces being opposed to the axial-direction one-side surfaces of the two outside disks; support members disposed by two or more respectively between the one side axial-direction surface of the inside disk and the axial-direction one-side surface of the out side disk with respect to the axial direction of the toroidal-type continuously variable transmission so as to be swung and shifted about pivot shafts disposed on the two end portions thereof; power rollers each including a peripheral surface formed as a spherical-shaped convex surface, the power rollers respectively being rotatably supported on the support members, the peripheral surface of the power rollers being contacted with the axial-direction two-side surface of the inside disk and the axial-direction one-side surface of the outside disk; and, ball bearings for supporting the inside disk in such a manner that the inside disk can be rotated with respect to the casing.

And, the present toroidal-type continuously variable transmission, preferably, further includes: a member fixed to the inner surface of the casing; wherein the inside disk includes axial-direction two end portions and the ball bearings support the member fixed to the inner surface of the casing in such a manner that the member is rotated with respect to small-diameter side of the end portion of the inside disk. And, in the present toroidal-type continuously variable transmission, Also, in the present toroidal-type continuously variable transmission, the ball bearings may preferably be formed of thrust angular ball bearings with a preload applied thereto.

Further, in the present toroidal-type continuously variable transmission, the inside disk is an integrally-formed output side disk, the outside disks are a pair of input side disks, an output gear is disposed on the outer peripheral edge portion of the output side disk, the middle portion of the rotary shaft is inserted through the inside-diameter side of the output side disk in such a manner that the output side disk is shifted in the axial direction thereof, the pair of input side disks are supported on the rotary shaft so as to be rotated in synchronization with the rotary shaft, one of the input side disks is supported on one end portion of the rotary shaft so as to be shifted in the axial direction thereof, and a pressing device for pressing against the one input side disk toward the other input side disk is disposed.

And, according to another aspect of the present invention, there is provided a continuously variable transmission apparatus having a combination of a toroidal-type continuously variable transmission unit and a planetary-gear-type transmission unit, and further having an input shaft connected to a rotary shaft of the toroidal-type continuously variable transmission unit and an output shaft connected to components of the planetary-gear-type transmission unit, a toroidal-type continuously variable transmission as the toroidal-type continuously variable transmission unit has: a casing; a rotary shaft rotatably supported in the interior of the casing; a pair of outside disks each including an axial-direction one-side surface having an arc-shaped section and rotatably supported on two ends of the rotary shaft so as to be rotated in synchronization with the rotary shaft, the respective axial-direction one-side surfaces being opposed to each other,; an inside disk including axial-direction two-side surfaces each having an arc-shaped section and rotatably supported on the periphery of the middle portion of the rotary shaft so as to be rotated with respect to the rotary shaft, the axial-direction two-side surfaces being opposed to the axial-direction one-side surfaces of the two outside disks; support members disposed by two or more respectively between the one side axial-direction surface of the inside disk and the axial-direction one-side surface of the outside disk so as to be swung and shifted about pivot shafts disposed at positions twisted with respect to the rotary shaft; power rollers each including a peripheral surface formed as a spherical-shaped convex surface, the power rollers respectively being rotatably supported on the support members, the peripheral surfaces of the power rollers being contacted with the axial-direction surface of the inside disk and the axial-direction one-side surface of the outside disk; and, ball bearings for supporting the inside disk in such a manner that the inside disk is rotated with respect to the casing, wherein the planetary-gear-type transmission unit includes switch unit for receiving power from the rotary shaft and the inside disk of the toroidal-type continuously variable transmission unit and also for switching the transmission passage of the power into two systems.

According to the above continuously variable transmission apparatus, the planetary-gear-type transmission unit has: a carrier concentrically connected and fixed to the pair of output side disks of the toroidal-type continuously variable transmission unit so as to be rotated together with the two output side disks; a plurality of first planetary gears rotatably supported on one of the axial-direction two-side surfaces of the carrier opposed to one of the outside disks; a first sun gear meshingly engaged with the first planetary gears; a plurality of second planetary gears rotatably supported on the other side surface of the carrier; a second sun gear rotatably disposed so as to be concentric with the disks, the second sun gear being meshingly engaged with the second planetary gears; a ring gear rotatably disposed so as to be concentric with the disks, the ring gear being meshingly engaged with the first planetary gears; and, also wherein the switch unit selects a first mode for transmitting power taken out from the inside disk through the ring gear to the output shaft and a second mode for transmitting power taken out from the inside disk through the second sun gear to the output shaft As described above, in the case of the toroidal-type continuously variable transmission and continuously variable transmission apparatus of the present invention, when compared with the conventional structure previously described, there is eliminated the need to provide, between a pair of inside disks, rolling bearings and a partition wall portion for supporting these rolling bearings. Therefore, the distance between these inside disks can be shortened and the inside disks can be formed as an integral body, which makes it possible to reduce the size and weight of the toroidal-type continuously variable transmission.

Also, since there is no possibility that ball bearings for supporting the input side disks can be greatly reduced in durability even in a state where a preload is applied to them, not only the durability of the ball bearings can be secured, but also the inside disks can be prevented from shifting in the axial direction thereof. This can prevent the transmission ratio from being changed unexpectedly, thereby being able to realize a transmission apparatus which does not give a driver any strange feeling.

Further, in case where the ball bearings are composed of thrust (angular) ball bearings, a space for providing the ball bearings can be prevented from increasing in size. Thanks to this, not only the toroidal-type continuously variable transmission can be reduced further in size but also the ball bearings can be made difficult to interfere with the power rollers, support members existing in the portions between the inside disks and outside disks, and further members fixed to the support members.

DETAILED DESCRIPTION OF THE PREFERRED EMBODIMENTS

Figure 1:
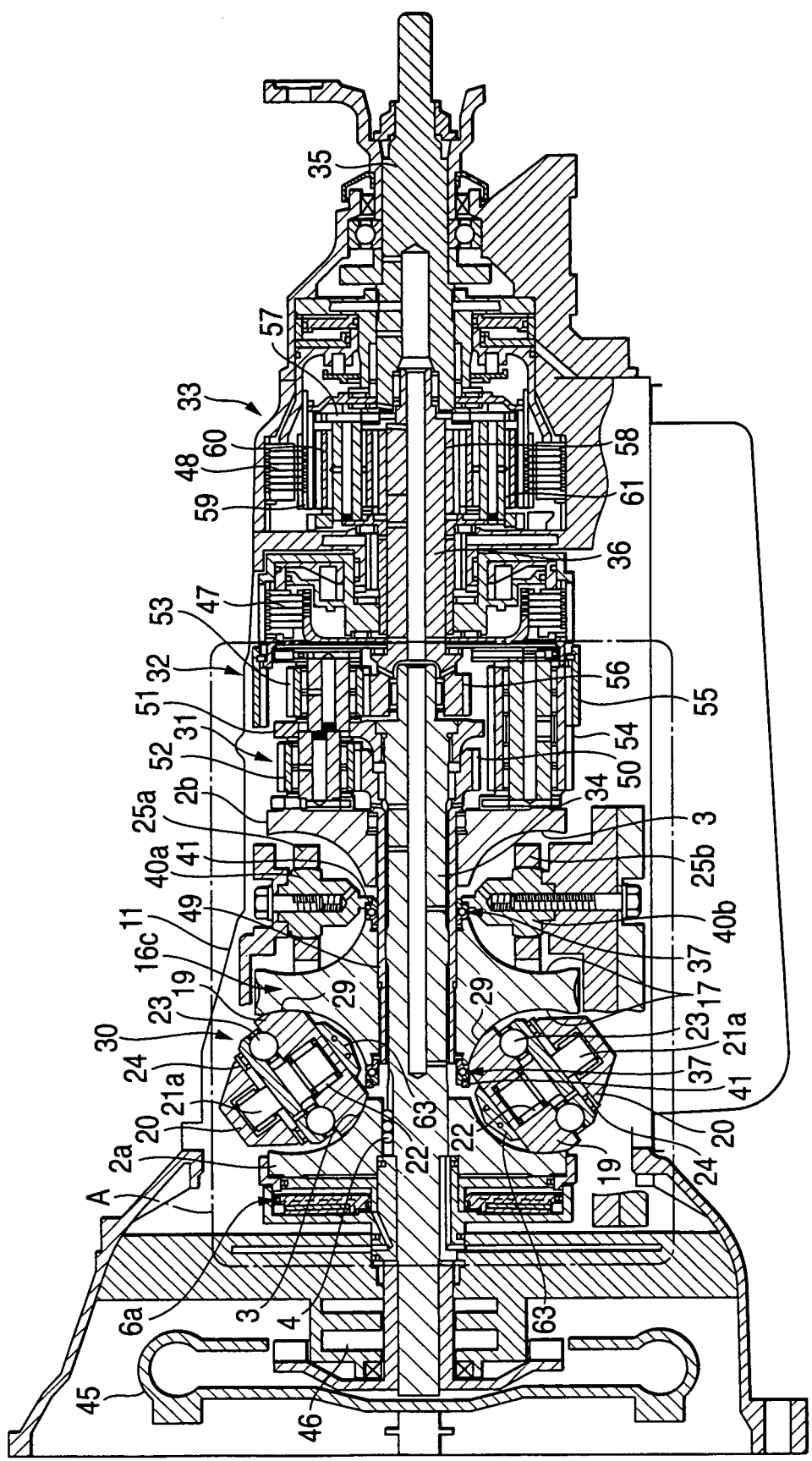
FIG. 1 is a section view of a first embodiment of a continuously variable transmission apparatus according to the present invention.
Figure 2:
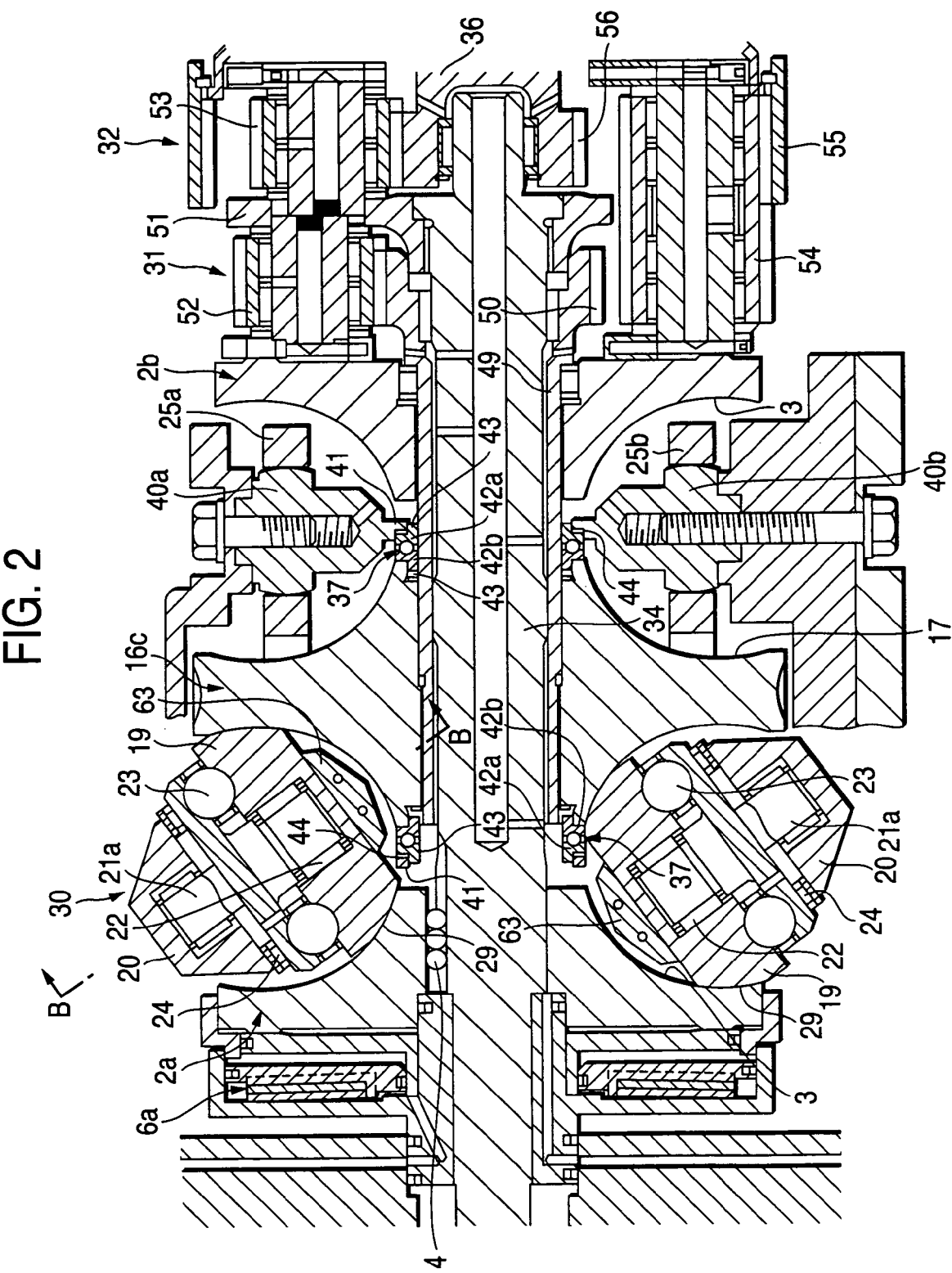
FIG. 2 is an enlarged view of the portion A shown in FIG. 1.
Figure 3:
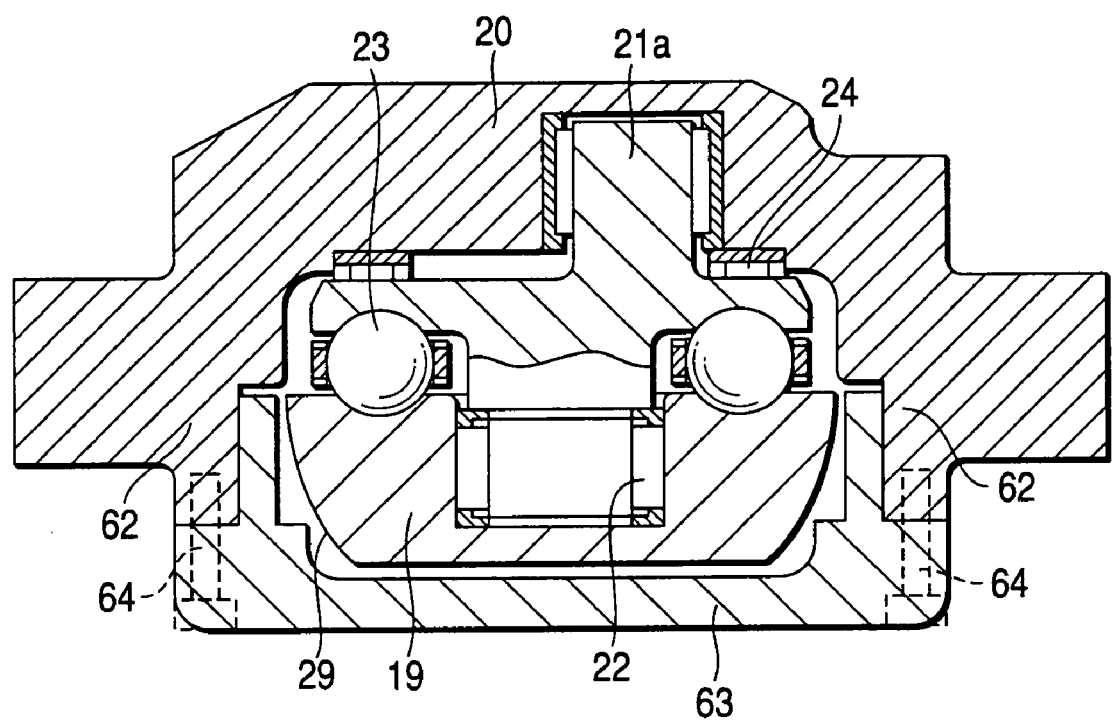
FIG. 3 is a section view of the portion B shown in FIG. 2.

Now, FIGS. 1 to 3 show a first embodiment of a continuously variable transmission apparatus according to the present invention. By the way, a toroidal-type continuously variable transmission according to the present invention, similarly to the previously described conventional toroidal-type continuously variable transmission, includes a casing, a rotary shaft, a pair of outside disks, an inside disk, support members, and power rollers.

Of the above components, the rotary shaft is rotatably supported in the interior of the casing.

Also, the respective outside disks, with their side surfaces each having an arc-shaped section opposed to each other, are supported on the two end portions of the rotary shaft in such a manner that they can be rotated in synchronization with the rotary shaft.

Further, the inside disk, with its two-side surfaces each having an arc-shaped section opposed to the side surfaces of the two outside disks, is supported on the periphery of the middle portion of the rotary shaft in such a manner that it can be rotated with respect to the rotary shaft.

And, the support members are interposed by two or more respectively between the two-side surfaces of the inside disk and the side surfaces of the outside disks with respect to the axial direction of the toroidal-type continuously variable transmission in such a manner that they can be swung and shifted about pivot shafts disposed at positions twisted with respect to the rotary shaft.

Also, the power rollers are rotatably supported on their associated support members, while the spherical-shaped peripheral surfaces of the power rollers are contacted with the two-side surfaces of the inside disk and the side surfaces of the outside disks.

And, in FIGS. 1 and 2, the section position of one cavity (a portion existing between one input side disk 2a and one side surface of an output side disk 16c) is different by 90° in the circumferential direction from the section position of the other cavity (a portion existing between the other input side disk 2b and the other side surface of the output side disk 16c). The continuously variable transmission apparatus according to the present invention comprises a combination of a toroidal-type continuously variable transmission unit 30 serving as a toroidal-type continuously variable transmission and first to third planetary-gear-type transmission units 31 to 33; and, the present continuously variable transmission apparatus further includes an input shaft 34 and an output shaft 35. In the illustrated embodiment, between the input shaft 34 and output shaft 35, there is interposed a transmission shaft 36 in such a manner that it is concentric with these two shafts 34, 35 and can be rotated with respect to the two shafts 34, 35. And, the first and second planetary-gear-type transmission units 31, 32 are respectively disposed over and between the input shaft 34 and transmission shaft 36, while the third planetary-gear-type transmission unit 33 is disposed over and between the transmission shaft 36 and output shaft 35.

The toroidal-type continuously variable transmission unit 30 comprises a pair of input side disks 2a, 2b serving as outside disks, an integrally-formed output side disk 16c serving as an inside disk, and a plurality of power rollers 19, 19. And, the pair of input side disks 2a, 2b respectively include an axial-direction one side surface having an arc-shaped section; and, with their respective axial-direction one-side surfaces opposed to each other, the two input side disks 2a, 2b are connected together through the input shaft 34 serving as a rotary shaft in such a manner that they are concentric with each other and can be rotated in synchronization with each other. Also, the output side disk 16c includes the axial-direction two-side surfaces each having an arc-shaped section; and, the output side disk 16c is supported between the two input side disks 2a, 2b in such a manner that it is concentric with the two input side disks 2a, 2b and can be rotated with respect to the two input side disks 2a, 2b. Further, the power rollers 19, 19 respectively include a spherical-shaped convex surface; and, they are interposed and held by two or more respectively between the axial-direction two-side surfaces of the output side disk 16c and the axial-direction one-side surfaces of the two input side disks 2a, 2b. And, while rotating with the rotation of the two input side disks 2a, 2b, the power rollers 19, 19 transmit the power from the input side disks 2a, 2b to the output side disk 16c. By the way, the input side disk 2a situated on the left side in FIG. 1 is supported on the input shaft 34 through ball splines 4. Therefore, the input side disk 2a is supported in such a manner that it can be shifted in the axial direction of the input shaft 34 and can be rotated in synchronization with the input shaft 34. Also, the input side disk 2b situated on the right side in FIG. 1 is supported on the input shaft 34 by radial needle roller bearings in such a manner that it can be rotated in the axial direction thereof.

Also, there is disposed a pressing device 60 which is used to press against the input side disk 2a toward the input side disk 2b.

Also, in the present embodiment, as shown in detail in FIG. 3, the leading end portions of a pair of bent wall portions 62, 62, which are respectively disposed on the longitudinal-direction two end portions of trunnions 20, 20 serving as support members for supporting the power rollers 19, 19, are connected together by connecting members 63, 63. Each of the connecting members 63 is disposed so as to stretch over its associated power roller 19; and, with its two end faces butted against the leading end edges (in FIG. 3, the lower end edges) of the bent wall portions 62, 62 of its associated trunnion 20, the connecting member 63 is connected and fixed to the trunnions 20 by screw pins 64, 64. In the case of the present embodiment in which these connecting members 63, 63 are disposed, the bending rigidity of the trunnions 20, 20 can be enhanced, so that the trunnions 20, 20 can be made difficult to be deformed elastically. As a result of this, the inclination of displacement shafts 21a due to the deformation of the trunnions 20, 20 can be prevented, thereby being able to prevent the positions of the power rollers 19, 19 supported on the front half sections of these displacement shafts 21a can be prevented from shifting. This makes it possible to stabilize the transmission operation of the present continuously variable transmission apparatus. By the way, in the present embodiment, the displacement shaft 21a and outer races constituting thrust ball bearings 23 for supporting their associated power roller 19 rotatably are formed as an integral body.

Further, according to the present embodiment, the axial-direction two end portions of the output side disk 16c are supported on a casing by a pair of thrust angular ball bearings 37, 37 in such a manner that they can be rotated with respect to the casing. For this purpose, in the present embodiment, the structure of support posts 40a, 40b, which are fixedly disposed on the inner surface of the casing 11 in order to support support plates 25a, 25b for supporting the two end portions of the trunnions 20, 20, is improved. That is, the pair of support posts 40a, 40b, which are concentrically disposed on the diameter-direction mutually opposite sides of the input shaft 34 with the input shaft 34 between them, are connected together by a circular-ring-shaped retaining ring 41. The input shaft 34 is inserted through the interior of the retaining ring 41.

And, the thrust angular ball bearings 37, 37 are interposed respectively between the retaining rings 41, 41 disposed in the respective cavities and the axial-direction two end faces of the out put side disk 16c, that is, the portions of the two-side surfaces of the output side disk 16c that are situated nearer to the inside-diameter side of the output side disk 16c than the output side surfaces 17, 17. In the illustrated embodiment, in the near-to-inside-diameter portions of the outer surfaces (which are mutually opposite-side side surfaces) of a pair of race ways 42a, 42b constituting their associated one of the thrust angular ball bearings 37, 37, there are formed short-cylindrical-shaped projecting strip portions 43, 43 over the entire peripheries of such near-to-inside-diameter portions. And, the projecting strip portions 43, 43 are fitted with the inner surfaces of the retaining rings 41, 41 and also with the inner surfaces of the end portions of the output side disk 16c, thereby positioning the thrust angular ball bearings 37, 37 in the diameter direction thereof. Also, shim plates 44, 44 are held by and between the outer surfaces of one-side raceways 42a, 42a and their associated retaining rings 41, 41 to thereby position the thrust angular ball bearings 37, 37 in the axial direction thereof. Further, in this state, a preload of a desired value is applied to the respective thrust angular ball bearings 37, 37. Therefore, the output side disk 16c is rotatably supported between the support posts 40a, 40b disposed by a pair in each of the cavities in such a manner that it is positioned in the diameter direction as well as in the axial direction.

Also, in the case of the illustrated continuously variable transmission apparatus, the base end portion (in FIG. 1, the left end portion) of the input shaft 34 is a crankshaft disposed in an engine (not shown) through a torsion damper 45, so that the input shaft 34 can be driven and rotated by the crankshaft. And, as a pressing device 6a which is used to apply a proper surface pressure to the rolling contact portions (traction portions) between the peripheral surfaces of the power rollers 19, 19 and not only the axial-direction one-side surfaces of the two input side disks 2a, 2b but also the two-side surfaces of the output side disk 16c, there is used a pressing device of an oil pressure type. Also, on the periphery of the base end portion of the input shaft 34, there is disposed a gear pump 46, thereby being able to supply pressure oil not only to an actuator (not shown) of an oil pressure type which is used to shift the pressing device 6a and the trunnions 20, 20 for transmission but also to an oil pressure cylinder used to connect and disconnect a low-speed clutch 47 and a high-speed clutch 48 (both of which will be discussed later).

Also, the base end portion (in FIGS. 1 and 2, the left end portion) of a hollow rotary shaft 49 is spline engaged with the output side disk 16c. And, the hollow rotary shaft 49 is inserted into the interior of the input side disk 2b situated on the distant side from the engine (in FIGS. 1 and 2, situated on the right side), thereby being able to take out the rotation power of the output side disk 16c. Further, on the portion of the leading end portion (in FIGS. 1 and 2, the right end portion) of the hollow rotary shaft 49 that projects from the outer surface of the input side disk 2b, there is fixedly disposed a first sun gear 50 which constitutes the first planetary-gear-type transmission unit 31.

On the other hand, between the input side disk 2b and the portion of the leading end portion (in FIGS. 1 and 2, the right end portion) of the input shaft 34 that projects from the hollow rotary shaft 49, there is interposed a first carrier 51 so as to stretch over them, thereby allowing the input side disk 2b and input shaft 34 to rotate in synchronization with each other. And, at the peripheral-direction equidistant positions (generally, three to four positions) of the axial-direction two-side surfaces of the first carrier 51, there are rotatably supported planetary gears 52-54 which constitute the first and second planetary-gear-type transmission units 31, 32 which are each double pinion type. Further, on the periphery of one half section (in FIGS. 1 and 2, the right half section) of the first carrier 51, there is supported a first ring gear 55 in such a manner that it can be rotated.

Of the above planetary gears 52-54, the planetary gear 52, which is situated near to the toroidal-type continuously variable transmission unit 30 (in FIGS. 1 and 2, situated near to the left side) and is disposed on the inside with respect to the diameter direction of the first carrier 51, is meshingly engaged with the first sun gear 50. Also, the planetary gear 53, which is situated distant from the toroidal-type continuously variable transmission unit 30 (in FIGS. 1 and 2, situated on the right side) and is disposed on the inside with respect to the diameter direction of the first carrier 51, is meshingly engaged with a second sun gear 56 which is fixedly secured to the base end portion (in FIG. 1, the left end portion) of the transmission shaft 36. And, the remaining gear 54 disposed on the outside with respect to the diameter direction of the first carrier 51 is set larger in the axial-direction dimension than the inwardly situated planetary gears 52, 53 and is meshingly engaged with the two planetary gears 52, 53. Further, the remaining gear 54 is also meshingly engaged with the first ring gear 55. By the way, instead of a structure in which two planetary gears situated near to the diameter-direction outside are disposed so as to be independent of each other between first and second planetary gear units, it is also possible to employ a structure in which a wide ring gear is meshingly engaged with these two planetary gears.

On the other hand, a second carrier 57, which is used to constitute the third planetary-gear-type transmission unit 33, is connected and fixed to the base end portion (in FIG. 1, the left end portion) of the output shaft 35. And, the second carrier 57 is connected to the first ring gear 55 through the low-speed clutch 47. Also, a third sun gear 58 is fixed by spline engagement to the near-to-leading-end portion (in FIGS. 1 and 2, the near-to-right-end portion) of the transmission shaft 36. On the periphery of the third sun gear 58, there is disposed a second ring gear 59; and, between the second ring gear 59 and the fixed portion of the continuously variable transmission apparatus such as the casing 11, there is interposed the high-speed clutch 48. Further, two or more sets of planetary gears 60, 61, which are interposed between the second ring gear 59 and third sun gear 58, are rotatably supported on the second carrier 57. Each set of planetary gears 60, 61 are meshingly engaged with each other; and, the planetary gear 60 disposed on the inside with respect to the diameter direction of the second carrier 57 is meshingly engaged with the third sun gear 58, while the planetary gear 61 disposed on the outside is meshingly engaged with the second ring gear 59.

In the above-structured continuously variable transmission apparatus according to the present embodiment, the power, which is transmitted from the input shaft 34 through the pair of input side disks 2*a*, 2*b* and power rollers 19, 19 to the integrally-formed output side disk 16*c*, is taken out from the hollow rotary shaft 49. And, in a state where the low-speed clutch 47 is connected and the connection of the high-speed clutch 48 is cut off, by changing the transmission ratio of the toroidal-type continuously variable transmission unit 30, while maintaining constant the rotation speed of the input shaft 34, the rotation speed of the output shaft 35 can be switched over to forward and backward rotation conditions with a stop condition between them. That is, in this state, a differential component between the first carrier 51 rotating in a forward direction together with the input shaft 34 and the first sun gear 50 rotating in the opposite direction together with the hollow rotary shaft 49 is transmitted from the first ring gear 55 through the low-speed clutch 47 and second carrier 57 to the output shaft 35. In this state, not only by setting the transmission ratio of the toroidal-type continuously variable transmission unit 30 at a given value, the output shaft 35 can be stopped, but also by changing the transmission ratio of the toroidal-type continuously variable transmission unit 30 from the given value to the speed increasing side, the output shaft 35 can be rotated in a direction to back a vehicle. On the other hand, by changing the transmission ratio of the toroidal-type continuously variable transmission unit 30 from the given value to the speed reducing side, the output shaft 35 can be rotated in a direction to advance the vehicle.

Further, in a state where the connection of the low-speed clutch 47 is cut off and the high-speed clutch 48 is connected, the output shaft 35 is rotated in the vehicle advancing direction. That is, in this state, the rotation power of the planetary gear 52 of the first planetary-gear-type transmission unit 31 rotatable according to a differential component between the first carrier 51 rotating in the forward direction together with the input shaft 34 and the first sun gear 50 rotating in the opposite direction together with the hollow rotary shaft 49 is transmitted through another planetary gear 54 to the planetary gear 53 of the second planetary-gear-type transmission unit 32 to thereby rotate the transmission shaft 36 through the second sun gear 56. And, due to the meshing engagement of the third sun gear 58 disposed on the leading end portion of the transmission shaft 36 with the second ring gear 59 and planetary gears 60, 61 cooperating together with the third sun gear 58 in constituting the third planetary-gear-type transmission unit 33, the second carrier 57 and output shaft 35 connected to the second carrier 57 are rotated in the vehicle advancing direction. In this state, as the transmission ratio of the toroidal-type continuously variable transmission unit 30 is changed to the speed increasing side, the rotation speed of the output shaft 35 can be increased accordingly.

Figure 4:
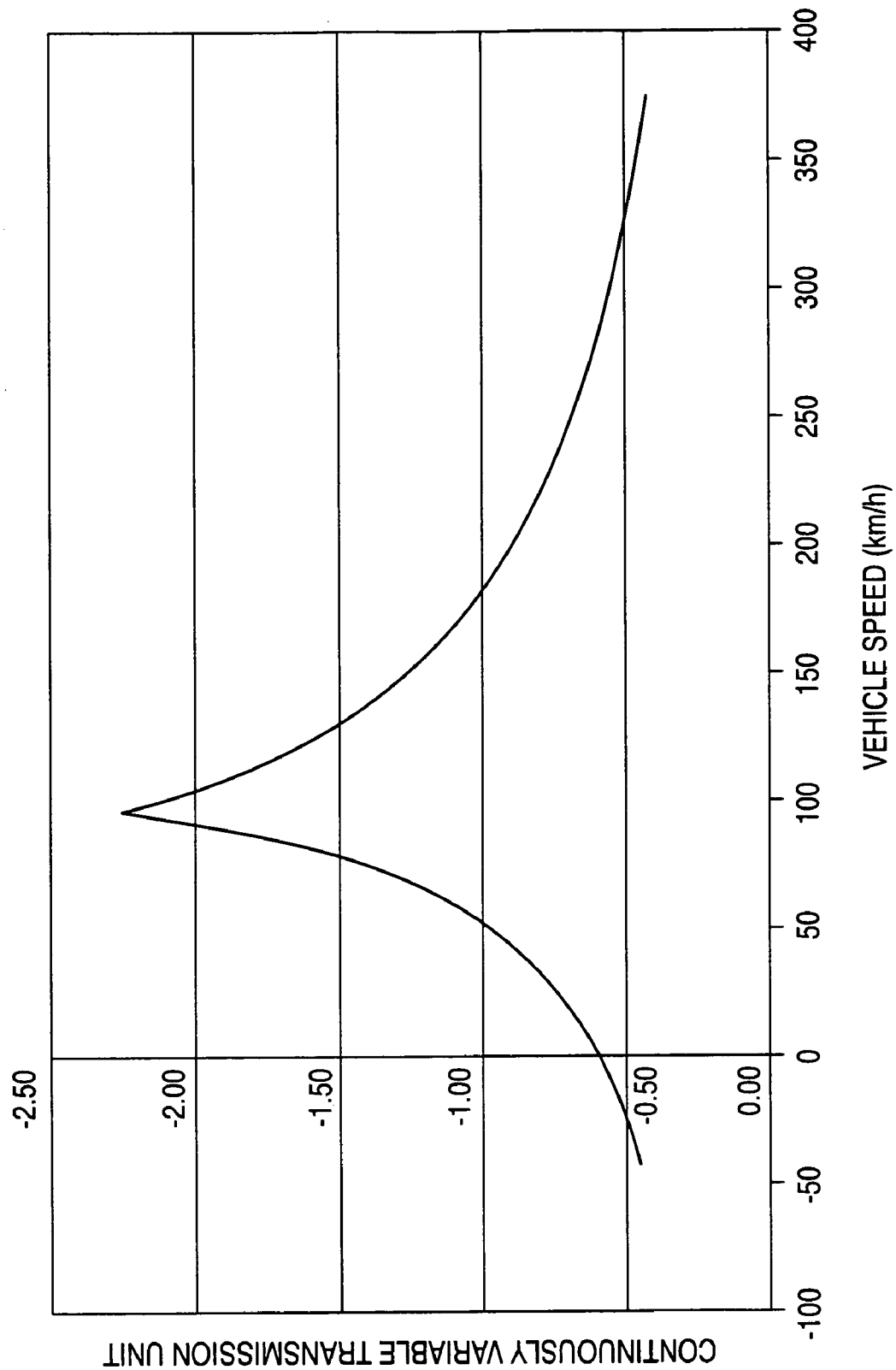
FIG. 4 is a graphical representation of the relationship between the transmission ratio (speed reducing ratio) of a toroidal-type continuously variable transmission unit and the vehicle speed (the transmission ratio of the whole of the continuously variable transmission apparatus)

Now, FIG. 4 shows the relationship between the transmission ratio (speed reduction ratio) of the toroidal-type continuously variable transmission unit 30 and the speed ratio of the whole of the continuously variable transmission apparatus. The vertical axis of FIG. 4 expresses the transmission ratio of the toroidal-type continuously variable transmission unit 30, while the horizontal axis expresses a theoretical vehicle speed (km/h) when the input shaft 34 is rotated at a constant speed (5600 $min^{-1}$) by an engine having a displacement volume of about 3 L. As can be seen clearly from FIG. 4, in a state where the low-speed clutch 47 is connected and the connection of the high-speed clutch 48 is cut off, by setting the transmission ratio of the toroidal-type continuously variable transmission unit 30 at about 0.6, the output shaft 35 can be stopped while the input shaft 34 is left rotating. Also, by changing the transmission ratio of the toroidal-type continuously variable transmission unit 30 with about 0.6 as the boundary thereof, the vehicle can be advanced or backed. Further, assuming that the transmission ratio of the toroidal-type continuously variable transmission unit 30 is set in the range of 2.2-2.3 as the boundary thereof, in a state where the connection of the low-speed clutch 47 is cut off and the high-speed clutch 48 is connected, by changing the transmission ratio of the toroidal-type continuously variable transmission unit 30 to the speed increasing side, the speed of the vehicle can be increased.

In the case of the toroidal-type continuously variable transmission unit 30 incorporated into the above structured and operated continuously variable transmission apparatus, differently from the conventional structure shown in FIG. 6, there is eliminated the need to interpose the rolling bearings 14, 14 and partition wall portion 12 (see FIG. 6) for supporting the rolling bearings 14, 14 between the pair of output side disks 16*a*, 16*b*. And, due to use of the integrally-formed output side disk 16*c*, the axial-direction dimension of the output side disk 16*c* installation portion can be reduced. And, the size and weight of the toroidal-type continuously variable transmission unit 30 can be reduced by an amount corresponding to the reduced axial-direction dimension.

Also, in the present embodiment, since the output side disk 16*c* is formed so as to have an integral structure in which the axial-direction two-side surfaces thereof are formed as the output side surfaces 17, 17, forces, which are respectively applied to the output side surfaces 17, 17 when the toroidal-type continuously variable transmission unit 30 is in operation, can be mutually cancelled within the output side disk 16c. As a result of this, the output side disk 16c can be prevented from being deformed elastically regardless of moment loads applied from the power rollers 19, 19. Therefore, it is possible to reduce the thickness dimension of the output side disk 16c in the axial direction thereof. That is, the size and weight of the toroidal-type continuously variable transmission can be reduced from this viewpoint as well.

Figure 5:
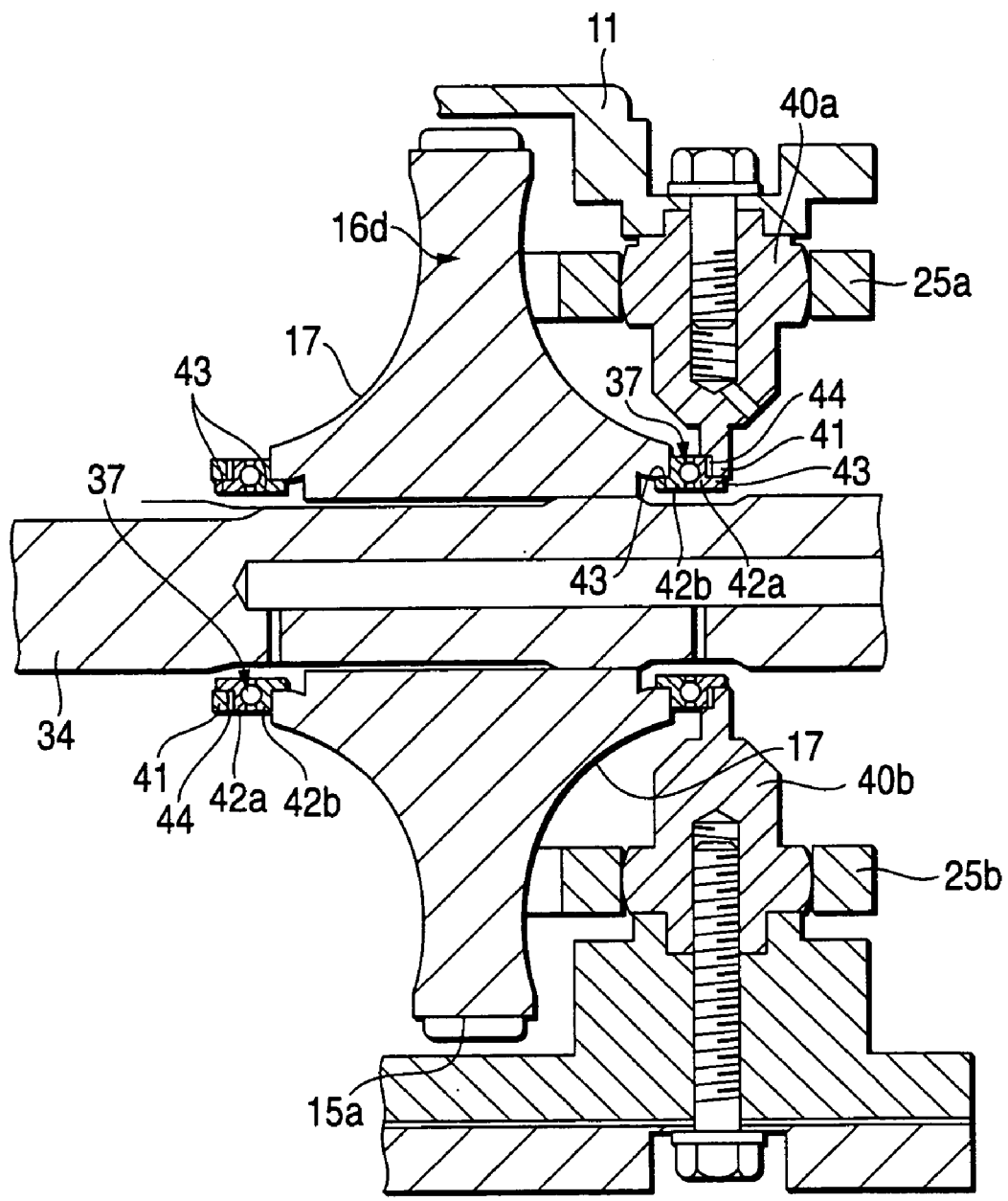
FIG. 5 is a section view of a second embodiment of a continuously variable transmission apparatus according to the present invention, corresponding to the central portion of FIG. 2; and, FIG. 6 is a section view of an example of the basic structure of a conventionally widely known toroidal-type continuously variable transmission apparatus, showing a portion thereof which is the same as the left-side cavity of FIG. 1 in the circumferential-direction phase.

Next, FIG. 5 shows a second embodiment of the present invention. In the case of the present embodiment, an output gear 15a is disposed on the edge portion of the outer periphery of an integrally-formed output side disk 16d in such a manner that it is formed integrally with the outside disk 16d. According to the present embodiment, a transmission shaft (not shown), which is used to take out power from the output side disk 16d, is disposed in parallel to an input shaft 34. And, another gear (not shown) fixedly disposed on the end portion of the transmission shaft is meshingly engaged with the output gear 15a. In the thus-structured second embodiment as well, the output side disk 16d is rotatably supported by a pair of thrust angular ball bearings 37, 37 which are respectively disposed on the axial-direction two end portions of the output side disk 16d.

Since the present invention is structured and operated in the above-mentioned manner, the axial-direction dimension of the continuously variable transmission apparatus can be reduced. Thus, the continuously variable transmission apparatus can be reduced in size and weight while securing the required performance thereof, which makes it possible to incorporate the continuously variable transmission apparatus into a vehicle body of a smaller size. Therefore, the present invention can contribute toward putting a toroidal-type continuously variable transmission into practical use.

What is claimed is:

1. A continuously variable transmission comprising:
a casing;
a rotary shaft rotatably supported in an interior of the casing;
a pair of outside disks each including an axial-direction one-side surface having an arc-shaped section and supported on the rotary shaft so as to be rotated in synchronization with the rotary shaft, the respective axial-direction one-side surfaces being opposed to each other;
an inside disk including axial-direction two-side surfaces each having an arc-shaped section and rotatably supported on the periphery of the middle portion of the rotary shaft so as to be rotated with respect to the rotary shaft, the axial-direction two-side surfaces being opposed to the axial-direction one-side surfaces of the two outside disks;
support members disposed by two or more respectively between the one side axial-direction surface of the inside disk and the axial-direction one-side surface of the out side disk with respect to the axial direction of the toroidal-type continuously variable transmission so as to be swung and shifted about pivot shafts disposed on the two end portions thereof;
power rollers each including a peripheral surface formed as a spherical-shaped convex surface, the power rollers respectively being rotatably supported on the support members, the peripheral surface of the power rollers being contacted with the axial-direction two-side surface of the inside disk and the axial-direction one-side surface of the outside disk;
ball bearings having inner and outer races, with a preload applied thereto, for supporting the inside disk in such a manner that the inside disk is rotated with respect to the casing, and
a member fixed to the inner surface of the casing,
wherein the inside disk includes axial-direction two end portions and the ball bearings are thrust bearings which support the member fixed to the inner surface of the casing in such a manner that the member is rotated with respect to small-diameter side of the end portion of the inside disk;
the thrust bearings are interposed between a retaining portion and the axial-direction two end portions; and
a plurality of projecting strips extending from the outer bearing races and fitted to an inner surface of the retaining portion, and a plurality of projecting strips extending from the inner bearing races and fitted to the arc shaped portion of the inside disk.

2. The continuously variable transmission as set forth in claim 1, wherein the ball bearings are thrust angular ball bearings.

3. The continuously variable transmission as set forth in claim 1, wherein the inside disk is an integrally-formed output side disk, the outside disks are a pair of input side disks, an output gear is disposed on the outer peripheral edge portion of the output side disk, the middle portion of the rotary shaft is inserted through the inside-diameter side of the output side disk in such a manner that the output side disk is shifted in the axial direction thereof, the pair of input side disks are supported on the rotary shaft so as to be rotated in synchronization with the rotary shaft, one of the input side disks is supported on one end portion of the rotary shaft so as to be shifted in the axial direction thereof, and a pressing device for pressing against the one input side disk toward the other input side disk is disposed.

4. The continuously variable transmission as set forth in claim 1, wherein the inside disk is formed as a monolith.

5. The continuously variable transmission as set forth in claim 1, wherein the thrust bearings support the inside disk in an axial direction of the rotary shaft.

6. A continuously variable transmission apparatus comprising a combination of a continuously variable transmission unit and a planetary-gear transmission unit, and further comprising an input shaft connected to a rotary shaft of the continuously variable transmission unit and an output shaft connected to components of the planetary-gear transmission unit,
a continuously variable transmission as the continuously variable transmission unit comprises:
a casing;
a rotary shaft rotatably supported in the interior of the casing;
a pair of outside disks each including an axial-direction one-side surface having an arc-shaped section and rotatably supported on two ends of the rotary shaft so as to be rotated in synchronization with the rotary shaft, the respective axial-direction one-side surfaces being opposed to each other;
an inside disk including axial-direction two-side surfaces each having an arc-shaped section and rotatably supported on the periphery of the middle portion of the rotary shaft so as to be rotated with respect to the rotary shaft, the axial-direction two-side surfaces being opposed to the axial-direction one-side surfaces of the two outside disks;

support members disposed by two or more respectively between the one side axial-direction surface of the inside disk and the axial-direction one-side surface of the outside disk so as to be swung and shifted about pivot shafts disposed at positions twisted with respect to the rotary shaft;

power rollers each including a peripheral surface formed as a spherical-shaped convex surface, the power rollers respectively being rotatably supported on the support members, the peripheral surfaces of the power rollers being contacted with the axial-direction surface of the inside disk and the axial-direction one-side surface of the outside disk; and, ball bearings having inner and outer races, with a preload applied thereto, for supporting the inside disk in such a manner that the inside disk is rotated with respect to the casing, and a member fixed to the inner surface of the casing, wherein the inside disk includes axial-direction two end portions and the ball bearings are thrust bearings which support the member fixed to the inner surface of the casing in such a manner that the member is rotated with respect to small-diameter side of the end portion of the inside disk, wherein the planetary-gear transmission unit includes switch unit for receiving power from the rotary shaft and the inside disk of the continuously variable transmission unit and also for switching the transmission passage of the power into two systems;

the thrust bearings are interposed between a retaining portion and the axial-direction two end portions; and a plurality of projecting strips extending from the outer bearing races and fitted to an inner surface of the retaining portion, and a plurality of projecting strips extending from the inner bearing races and fitted to the arc shaped portion of the inside disk.

7. The continuously variable transmission apparatus as set forth in claim 6, wherein the inside disk is formed as a monolith.

8. The continuously variable transmission as set forth in claim 6, wherein the thrust bearings support the inside disk in an axial direction of the rotary shaft.

9. A continuously variable transmission apparatus comprising a combination of a continuously variable transmission unit and a planetary-gear transmission unit, and further comprising an input shaft connected to a rotary shaft of the continuously variable transmission unit and an output shaft connected to components of the planetary-gear transmission unit, a continuously variable transmission as the continuously variable transmission unit comprises:

a casing;

a rotary shaft rotatably supported in the interior of the casing;

a pair of outside disks each including an axial-direction one-side surface having an arc-shaped section and rotatably supported on two ends of the rotary shaft so as to be rotated in synchronization with the rotary shaft, the respective axial-direction one-side surfaces being opposed to each other;

an inside disk including axial-direction two-side surfaces each having an arc-shaped section and rotatably supported on the periphery of the middle portion of the rotary shaft so as to be rotated with respect to the rotary shaft, the axial-direction two-side surfaces being opposed to the axial-direction one-side surfaces of the two outside disks;

support members disposed by two or more respectively between the one side axial-direction surface of the inside disk and the axial-direction one-side surface of the outside disk so as to be swung and shifted about pivot shafts disposed at positions twisted with respect to the rotary shaft;

power rollers each including a peripheral surface formed as a spherical-shaped convex surface, the power rollers respectively being rotatably supported on the support members, the peripheral surfaces of the power rollers being contacted with the axial-direction surface of the inside disk and the axial-direction one-side surface of the outside disk; and, ball bearings for supporting the inside disk in such a manner that the inside disk is rotated with respect to the casing, wherein the planetary-gear transmission unit includes switch unit for receiving power from the rotary shaft and the inside disk of the continuously variable transmission unit and also for switching the transmission passage of the power into two systems, wherein the planetary-gear transmission unit comprises:

a carrier concentrically connected and fixed to the pair of output side disks of the continuously variable transmission unit so as to be rotated together with the two output side disks;

a plurality of first planetary gears rotatably supported on one of the axial-direction two-side surfaces of the carrier opposed to one of the outside disks;

a first sun gear meshingly engaged with the first planetary gears;

a plurality of second planetary gears rotatably supported on the other side surface of the carrier;

a second sun gear rotatably disposed so as to be concentric with the disks, the second sun gear being meshingly engaged with the second planetary gears;

a ring gear rotatably disposed so as to be concentric with the disks, the ring gear being meshingly engaged with the first planetary gears; and, wherein the switch unit selects a first mode for transmitting power taken out from the inside disk through the ring gear to the output shaft and a second mode for transmitting power taken out from the inside disk through the second sun gear to the output shaft.

* * * * *